United States Patent
Kawachi et al.

(10) Patent No.: US 7,128,981 B2
(45) Date of Patent: Oct. 31, 2006

(54) SLIDING MEMBER

(75) Inventors: Toshiaki Kawachi, Inuyama (JP); Hideo Ishikawa, Inuyama (JP); Masaaki Sakamoto, Inuyama (JP)

(73) Assignee: Daido Metal Company, Ltd., Nagoya (JP)

( * ) Notice: Subject to any disclaimer, the term of this patent is extended or adjusted under 35 U.S.C. 154(b) by 116 days.

(21) Appl. No.: 10/854,261

(22) Filed: May 27, 2004

(65) Prior Publication Data

US 2004/0241489 A1    Dec. 2, 2004

(30) Foreign Application Priority Data

May 29, 2003  (JP) .............................. 2003-153153

(51) Int. Cl.
*F16C 33/12* (2006.01)
*C22C 12/00* (2006.01)
*B32B 15/00* (2006.01)

(52) U.S. Cl. ...................... 428/642; 384/912; 420/577

(58) Field of Classification Search .................... None
See application file for complete search history.

(56) References Cited

U.S. PATENT DOCUMENTS

| 6,309,759 B1 | 10/2001 | Tomikawa et al. |
| 6,585,149 B1 * | 7/2003 | Nakatsuka et al. ...... 228/180.1 |
| 6,703,113 B1 * | 3/2004 | Takaoka et al. ............ 428/209 |
| 2003/0048961 A1 | 3/2003 | Kawachi et al. |

FOREIGN PATENT DOCUMENTS

JP    11-050296    2/1999

OTHER PUBLICATIONS

Translation of JP 11-050296.*

* cited by examiner

*Primary Examiner*—John J. Zimmerman
(74) *Attorney, Agent, or Firm*—Browdy and Neimark, PLLC

(57) ABSTRACT

Disclosed is a sliding member including an overlay layer made of a Bi based alloy comprising Cu as an essential element and at least one element selected from the group of Sn and In, wherein the Bi based alloy comprises 0.1 to 10 mass % of Cu and 0.5 to 10 mass % in total of the at least one element selected from the group of Sn and In.

4 Claims, 1 Drawing Sheet

SLIDING MEMBER

BACKGROUND OF THE INVENTION

The present invention relates to a sliding member comprising an overlay layer made of a Bi based alloy.

A plain bearing, in which a bearing alloy layer made of a Cu alloy or an Al alloy is lined on a steel backing layer, has been often used in internal combustion engines of automobiles or the like. In order to improve conformability of such a bearing with a mating shaft, an overlay layer is formed on the surface of the bearing alloy layer with or without an intermediate layer.

Conventionally, the overlay layer has been made of a soft Pb alloy, occasionally a Sn alloy. The intermediate layer has been often made of a Ni alloy, a Ag alloy and so on.

However, it is undesirable to use Pb if possible, because it is a pollutant to the environment. In order to solve the Pb problem, various researches have been conducted, wherein one example has been proposed to use Bi as an alternative to Pb. However, Bi is hard and inferior in conformability. In order to solve this problem, there has been proposed one idea to make the overlay layer with a Bi alloy which contains one or more additive elements selected from the group of Sn, In and Ag (see, for example, JP-A-11-50296).

BRIEF SUMMARY OF THE INVENTION

When a Bi based alloy containing Sn, In and/or Ag is used for an overlay layer, Sn and/or In in the overlay layer diffuses into an intermediate layer of a Ni alloy or a Co alloy. In the case where a bearing alloy layer is of a Cu alloy and adjacent to the overlay layer without an intermediate layer, Sn and/or In in the overlay layer further diffuses into the Cu alloy. Once the diffusion of Sn and/or In into the intermediate layer or the bearing alloy layer is saturated, a boundary layer containing a much amount of Sn and/or In can be created between the overlay layer and the intermediate layer adjacent to the overlay layer, or between the overlay layer and the bearing alloy layer adjacent to the overlay layer. Since the melting point of such a boundary layer is very low, there will occur a phenomenon of exfoliation of the overlay layer due to thermal fatigue of the boundary layer resulting in poor fatigue resistance. Accordingly, the overlay layer can result in one having inferior resistance to fatigue.

The present invention has been proposed in light of the above technical background.

An object of the invention is to provide a sliding member comprising an overlay layer made of a Bi based alloy, wherein a Bi property of brittleness is improved to realize good conformability of the overlay layer without deteriorating the overlay layer in fatigue resistance.

According to the invention, the overlay layer is formed from a Bi based alloy containing an indispensable element of Cu and at least one element selected from the group of Sn and In, wherein the Bi based alloy comprises 0.1 to 10 mass % of Cu and 0.5 to 10 mass % in total of the at least one element selected from the group of Sn and In. In the invention, a bearing alloy can be a Cu alloy or an Al alloy.

When Sn and/or In are added to a Bi—Cu alloy, the melting point of a Bi—Cu alloy matrix falls, whereby the Bi—Cu alloy becomes softer at a usual working temperature of a sliding member to realize good conformability of the Bi—Cu alloy. Preferably the melting point of the overlay layer is not lower than 225° C., more preferably not lower than 250° C.

As described above, the additive Sn and In lower the melting point of the overlay layer to improve the conformability. However, if the additive amounts of Sn and/or In is less than 0.1 mass %, no such a softening effect can be obtained, so that an improvement effect for the conformability is insufficient. On the other hand, in the case of more than 10 mass % of Sn and/or In, the melting point of the overlay layer falls excessively to adversely affect antiseizure property of the overlay layer.

Cu forms an alloy with Bi and makes the crystal structure of Bi fine, thereby improving Bi in hard and brittle properties, so that the overlay layer is improved in fatigue resistance. Further, because of a high affinity of copper with Sn and In, copper prevents Sn and In from diffusing into an intermediate layer or the bearing alloy layer under heating. Thus, the overlay layer undergoes only a small deterioration of time, so that the initial excellent sliding properties can be kept over a long period of time. If the Cu amount in the overlay layer is less than 0.1 mass %, the above effects can not be obtained, which are to make the Bi crystal structure fine and to inhibit diffusion of Sn and In. On the other hand, if the Cu amount exceeds 10 mass %, the Bi matrix of the overlay layer becomes too hard.

Preferably, the overlay layer can contain 0.1 to 20 mass % of Sb thereby preventing the overlay layer from an excessive drop of the melting point thereof caused by additive Sn and In, whereby the conformability of the overlay layer is maintained. If the Sb amount is less than 0.1 mass %, the above advantages can not be obtained. If the Sb amount exceeds 20 mass %, the Bi matrix becomes too hard.

It is preferable to form the overlay layer on the bearing alloy layer via an intermediate layer which is made of any one metal selected from the group of Ni, a Ni alloy, Cu, a Cu alloy, Ag, a Ag alloy, Co and a Co alloy in order to enhance an adhesion property of the overlay layer to the bearing alloy layer. Cu and Ag combine with atomic Bi in the overlay layer to strengthen the above adhesion property, whereby an exfoliation problem of the overlay layer when suffering a high load hardly occurs, so that the overlay layer is improved in fatigue resistance. According to an experiment conducted by the inventors, also in the case where the intermediate layer is made of any one of Ni, Co and an alloy thereof, the results are substantially identical to those of the intermediate layer made of any one of Cu, Ag and an alloy thereof.

DETAILED DESCRIPTION

Herein below, there will be provided a description on embodiments of the present invention.

Figure 1:
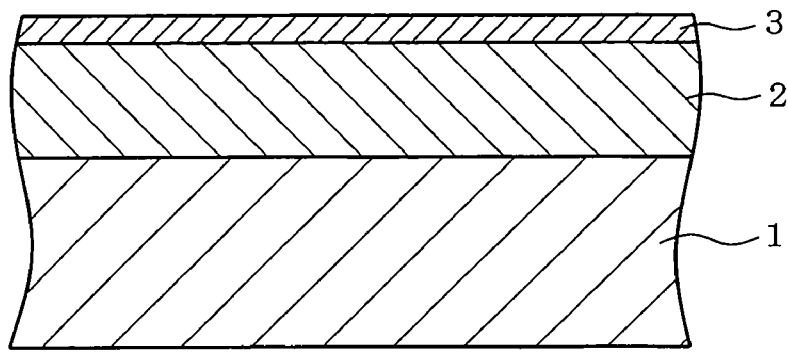
FIG. 1 is a cross-sectional view of one embodiment of the present invention.

FIG. 1 shows a plain bearing which consists of a steel backing layer 1, a bearing alloy layer 2 made of a Cu alloy or an Al alloy which is formed on the steel backing layer 1, and an overlay layer 3 which is formed on the bearing alloy layer 2.

Figure 2:
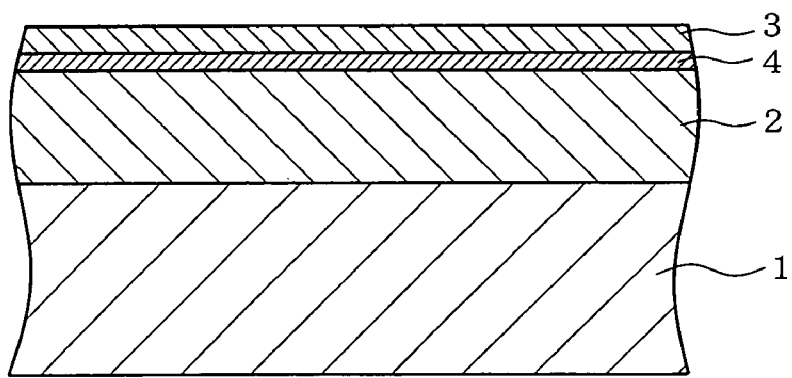
FIG. 2 is a cross-sectional view of another embodiment of the present invention.

An alternative embodiment plain bearing is shown in FIG. 2, which has generally the same structure except for an existence of an intermediate layer 4 being interposed between the bearing alloy layer 2 and the overlay layer 3.

An experiment was conducted in order to confirm anti-seizure property of the plain bearing, which has such multi-layered structures shown in FIGS. 1 and 2.

First and second type specimens were prepared, wherein the first type is as shown in FIG. 1, and the second type is as shown in FIG. 2. The first type specimens were Invention Specimen Nos. 1, 2, 6 and 7, and Comparative Specimen Nos. 2 and 3. The second type specimens were Invention Specimen Nos. 3 to 5, and Comparative Specimen Nos. 1 and 4. Details of all the specimens, which include chemical compositions of the specimen overlay layers, are shown in Table 1. The respective overlay layer had a preferable thickness of 3 to 15 μm.

Both of the overlay layer 3 and the intermediate layer 4 were formed by electroplating. Herein below there are shown plating conditions for forming the overlay layers made of a Bi—Cu alloy.

(1) Composition of plating bath
  Bismuth oxide: 10 to 70 gr/liter
  Basic copper carbonate: 0.5 to 5 gr/liter
  Methanesulfonic acid: 30 to 150 ml/liter
  HS-220S (product name; provided by Ebara-Udylite Co., Ltd., Japan): 20 to 60 ml/liter
(2) Temperature of plating bath: 25 to 40° C.
(3) Current density: 1 to 6 A/dm$^2$ In order to control the surface roughness of a Bi—Cu alloy plating to be fine, the PRE method (Periodic Reverse Electroplating) is recommended. According to the PRE, a cathode current is alternated periodically to an anode current, wherein in general a time rate of an anode current flow time to a cathode current flow time is approximately 10 to 20%. The longer the anodecurrent flow time is, the higher the leveling effect for the plating surface becomes, while the plating rate decreases.

While it is possible to carry out an alloy plating process in the case of a Bi—Cu alloy containing Sn, In, and/or Sb, the Invention specimens were prepared by applying at first a Bi—Cu alloy plating layer on the bearing alloy layer, and subsequently forming at least one plating layer selected from the group of Sn, In and Sb on the Bi—Cu alloy plating layer thereby obtaining a plurality of plating layers. A Sn layer was plated with utilization of a tin sulfate plating solution, In an indiumamidosulfate (indiumsulfamate) plating solution, and Sb an antimony borofluoride plating solution.

A seizure test was conducted for each of the above specimens shown in Table 1 in accordance with the test conditions shown in Table 2. A melting point of a matrix of the respective overlay layer was determined on the basis of a differential temperature curve. Results of the seizing test and measured values of melting point are shown in above Table 1.

TABLE 2

| Conditions of Seizure Test | |
| --- | --- |
| Test Machine | Seizure test machine |
| Rotational speed | 7200 rpm |
| Peripheral speed | 20 m/sec |
| Test load | Raised by 5 MPa in increments of 10 min. |
| Oil temperature | 100° C. |
| Oil feed rate | 150 ml/min. |
| Lubricant oil | VG22 |
| Test shaft | JIS S55C |
| Method of evaluation | It was determined that a seizure occurred, when a temperature of a back surface of a bearing exceeded 200° C., or idling of a driving belt for the shaft occurred due to a torque variation. |

Discussions about the test results shown in Table 1 will be made as follows.

An advantageous effect of additive Sn in the Bi overlay layer can be well understood by a comparison between the Comparative Specimen Nos. 1 and 2. While the melting point of Bi is about 270° C., the melting point of the Bi overlay layer containing Sn (Comparative Specimen No. 1) became lower than that of pure Bi. Contrasting, when Cu was added (Comparative Specimen No. 2), the melting point of the Bi—Cu overlay layer went up significantly. Comparative Specimen No. 1 which had the lowered melting point exhibited a higher maximum specific load without seizure than that of Comparative Specimen No. 2. This test result proves that Comparative Specimen No. 1 has a better anti-seizure property.

TABLE 1

| Specimen No. | Overlay Layer Chemical Composition (mass %) | | | | | Overlay Layer Melting Point (° C.) | Bearing Alloy | Intermediate Layer | Maximum Specific Load without Seizure (MPa) |
| --- | --- | --- | --- | --- | --- | --- | --- | --- | --- |
| | Bi | Cu | Sn | In | Sb | | | | |
| Invention Specimen | | | | | | | | | |
| 1 | 93.8 | 0.2 | 6 | — | — | 250 | Cu alloy | none | 80 |
| 2 | 94.5 | 0.5 | — | 5 | — | 250 | Cu alloy | none | 80 |
| 3 | 88 | 2 | 10 | — | — | 230 | Cu alloy | Ag | 75 |
| 4 | 86 | 4 | 5 | 5 | — | 230 | Al alloy | Cu | 75 |
| 5 | 87 | 5 | — | 2 | 6 | 300 | Cu alloy | Co | 85 |
| 6 | 90 | 8 | 2 | — | — | 280 | Cu alloy | none | 80 |
| 7 | 88 | 10 | — | 1 | — | 280 | Cu alloy | none | 80 |
| Comparative Specimen | | | | | | | | | |
| 1 | 86 | — | 14 | — | — | 220 | Cu alloy | Ni | 60 |
| 2 | 85 | 15 | — | — | — | 770 | Cu alloy | none | 55 |
| 3 | 77 | 5 | 12 | 6 | — | 220 | Cu alloy | none | 55 |
| 4 | 80 | 5 | 15 | — | — | 220 | Al alloy | Cu | 55 |

A reason behind such test results is that when the melting point of the overlay layer decreased due to the addition of Sn, the overlay layer was softened at the lubricant temperature of 100° C. to become good in conformability with a mating shaft resulting in improved anti-seizure property. However, when Cu was added, the melting point of the Bi overlay layer rises instead and no softening occurred at the lubricant temperature of 100° C. in the seizure test. Further, as effects of a strength increase brought about by the addition of Cu prevailed, the overlay layer had inferior conformability resulting in deteriorated anti-seizure property.

With regard to the fact that fatigue resistance property is enhanced by improving mechanical strength of a metal material, Comparative Specimen No. 2 having improved strength by virtue of the additive Cu exhibited excellent fatigue resistance than Comparative Specimen No. 1 containing Sn in the Bi overlay layer have been already confirmed by another experiment.

From the above discussion, it has become clear that the additive Cu increases strength of the overlay layer to improve fatigue resistance, and the additive Sn decreases the melting point of the overlay layer to improve the conformabilty and anti-seizure property.

Invention Specimen Nos. 1 to 7 prepared by adding Cu which has the effects as described above as an essential element and also at least one element selected from the group of Sn and In to the Bi overlay layer exhibited a excellent anti-seizure property than Comparative Specimen Nos. 1 and 2 prepared by adding Cu alone or Sn alone to the Bi overlay layer.

Further, Invention Specimen Nos. 1 to 7 showed a more satisfactory anti-seizure property than Comparative Specimen No. 3 prepared by adding Cu, Sn, and In to the Bi overlay layer as well as Comparative Specimen No. 4 prepared by adding Cu and Sn to the Bi overlay layer.

The inferior anti-seizure property of Comparative Specimen No. 3 is considered to have been caused by a fact that because of their high contents of Sn and/or In, more specifically, 18 mass % in total of Sn and In in Comparative Specimen No. 3 and 15 mass % of Sn in Comparative Specimen No. 4, the melting point of the overlay layer too decreased, and the excessive reduction became the cause of the deterioration in anti-seizure property.

On the other hand, as to Invention Specimen Nos. 1 to 7, it is considered that as the content of Sn and In was controlled to be no more than 10 mass %, the melting point of the overlay layer fell to an appropriate level and the overlay layer demonstrated improved anti-seizure property.

Here, the overlay layer of Invention Specimen No. 5 having been prepared by adding 5 mass % of Cu, 2 mass % of In, and 6 mass % of Sb to the Bi overlay layer recorded a relatively high melting point of 300° C. and a good anti-seizure property. The cause of this improvement is that the additive Sb prevented the excessive reduction in the melting point due to the additive In and maintained the conformability.

The invention claimed is:

1. A sliding member, comprising
a bearing alloy layer and an overlay layer which is formed on the bearing layer, wherein:
the overlay layer is made of a Bi based alloy comprising 0.1 to 10 mass % of Cu and 0.5 to 10 mass % in total of at least one element selected from the group of Sn and In;
wherein the Bi based alloy of the overlay layer further comprises 0.1 to 20 mass % of Sb.

2. A sliding member according to claim 1, wherein the Bi based alloy has a melting point of not lower than 225° C.

3. A sliding member according to claim 1, wherein the overlay layer is formed on the bearing alloy layer via an intermediate layer which is made of any one substance selected from the group consisting of Cu, a Cu alloy, Ag, a Ag alloy, Ni, a Ni alloy, Co, and a Co alloy.

4. A sliding member according to claim 2, wherein the overlay layer is formed on the bearing alloy layer via an intermediate layer which is made of any one substance selected from the group consisting of Cu, a Cu alloy, Ag, a Ag alloy, Ni, a Ni alloy, Co, and a Co alloy.

* * * * *